J. R. RUSBY.
CURTAIN FIXTURES.

No. 185,407. Patented Dec. 19, 1876.

Witness
Horace Harris
Chas. P. Rash

Inventor
Joseph R. Rusby.

UNITED STATES PATENT OFFICE.

JOSEPH R. RUSBY, OF BLOOMFIELD, NEW JERSEY.

IMPROVEMENT IN CURTAIN-FIXTURES.

Specification forming part of Letters Patent No. 185,407, dated December 19, 1876; application filed April 27, 1876.

*To all whom it may concern:*

Be it known that I, JOSEPH R. RUSBY, of Bloomfield, in the county of Essex and State of New Jersey, have invented a certain Improvement in Curtain-Fixtures, of which the following is a specification:

My invention consists in a friction attachment to curtain-fixtures for regulating the movement of the curtain.

Figure 1:
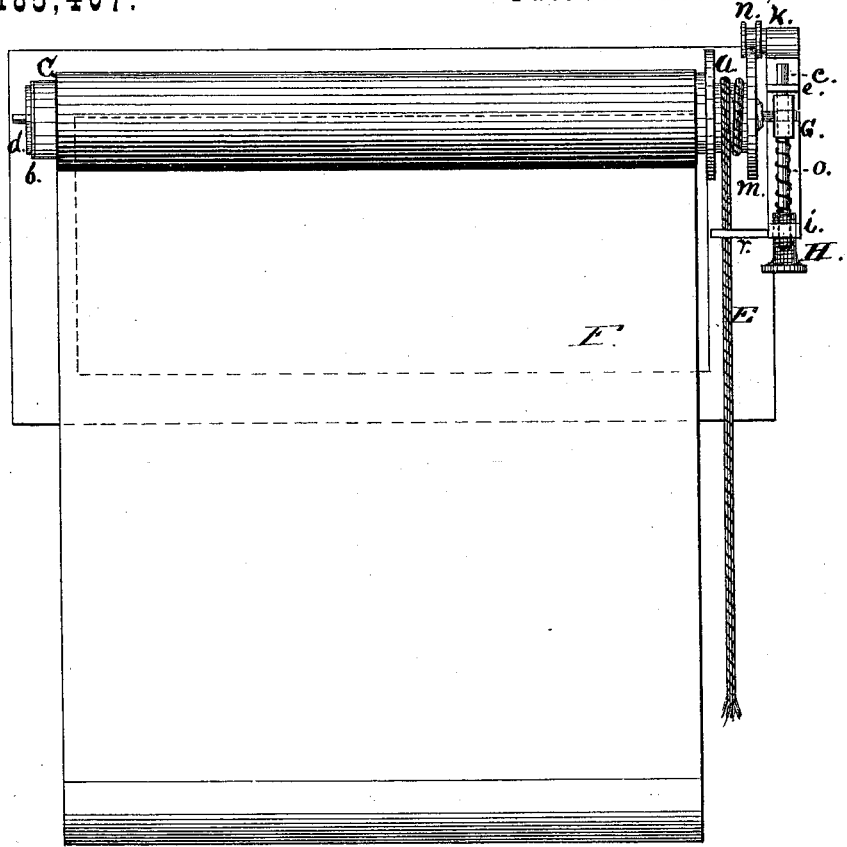
Figure 2:
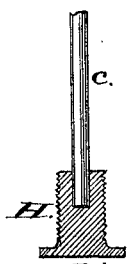

Figure 1 is a front elevation. Fig. 2 is a section, showing a connection between the shaft $c$ and the tension-screw H.

The devices I employ are as follow: The roller-caps $a$ and $b$, attached to the rolls C, are common ones, the one $b$ being merely a cap and journal, and rests in a notched bracket, $d$, and the one $a$ is grooved, in which groove the cord $e$ is wound up when the curtain F is drawn down, and this cap has the usual journal to rest in the movable bearing G in the shaft $c$. This shaft has journal ends, the lower turning in a hole in the end of the tension-screw H, above the bearing $i$, or nut in which the screw turns. The upper end slides in the bearing $e$.

The top of the fixture has a shaft, $k$, projecting out in the direction of the roll, and over the outer flange $m$ of the cap $a$, and on this shaft is a small grooved friction-roll, $n$, in which the flange rolls.

To operate the curtain the tension-screw is turned down to allow the flange to pass in below the roll $n$. Then the journal of cap $a$ is placed in the bearing G, and the journal of cap $b$ dropped in the bracket $d$. When in position the tension-screw is turned upward, and this presses up the shaft in which is the bearing G, and that carries up the flange $m$ into the groove of the roll $n$, and a proper tension on the screw holds the curtain in any desired position. When the curtain is to be taken down the screw is loosened, as before shown, and the spiral spring $o$ reacts the shaft, carrying down the bearing $d$ and end of the roll C until it may be detached. The spring provides also for inequalities that may be found in the cap $a$, and equalizes the tension.

In the place of the friction-roll $n$, a plate, projection may extend out over the flange, against which, by the tension-screw, the flange is pressed and turns, and the curtain is held in position by this friction. A guide, $r$, is attached to the bearing $i$, in which the cord moves. This guide has an opening on the back, so that the cord may be put in or taken out without removing the tassel.

What I claim as my invention, and desire to secure by Letters Patent, is—

1. In a curtain-fixture, the movable shaft $c$, having the bearing G and the spring O, in combination with the tension-screw H and journal of cap $a$, substantially as and for the purpose specified.

2. The tension-screw H, having in its end a bearing for the shaft $c$, and with the spring O, actuating said shaft, and thus, by the journal of cap $a$, pressing the flange $m$ up against the friction-roll $n$, substantially as and for the purposes set forth.

3. In combination with a curtain-fixture, having the tension-screw H, movable shaft $c$, flange $m$, and friction-plate $n$, the guide $r$, secured to the bearing of the said tension-screw, substantially as and for the purpose specified.

JOSEPH R. RUSBY.

Witnesses:
HORACE HARRIS,
CHAS. P. ROSS.